No. 767,249. PATENTED AUG. 9, 1904.
F. & R. P. RUSSELL.
DRILL.
APPLICATION FILED MAR. 19, 1904.
NO MODEL.
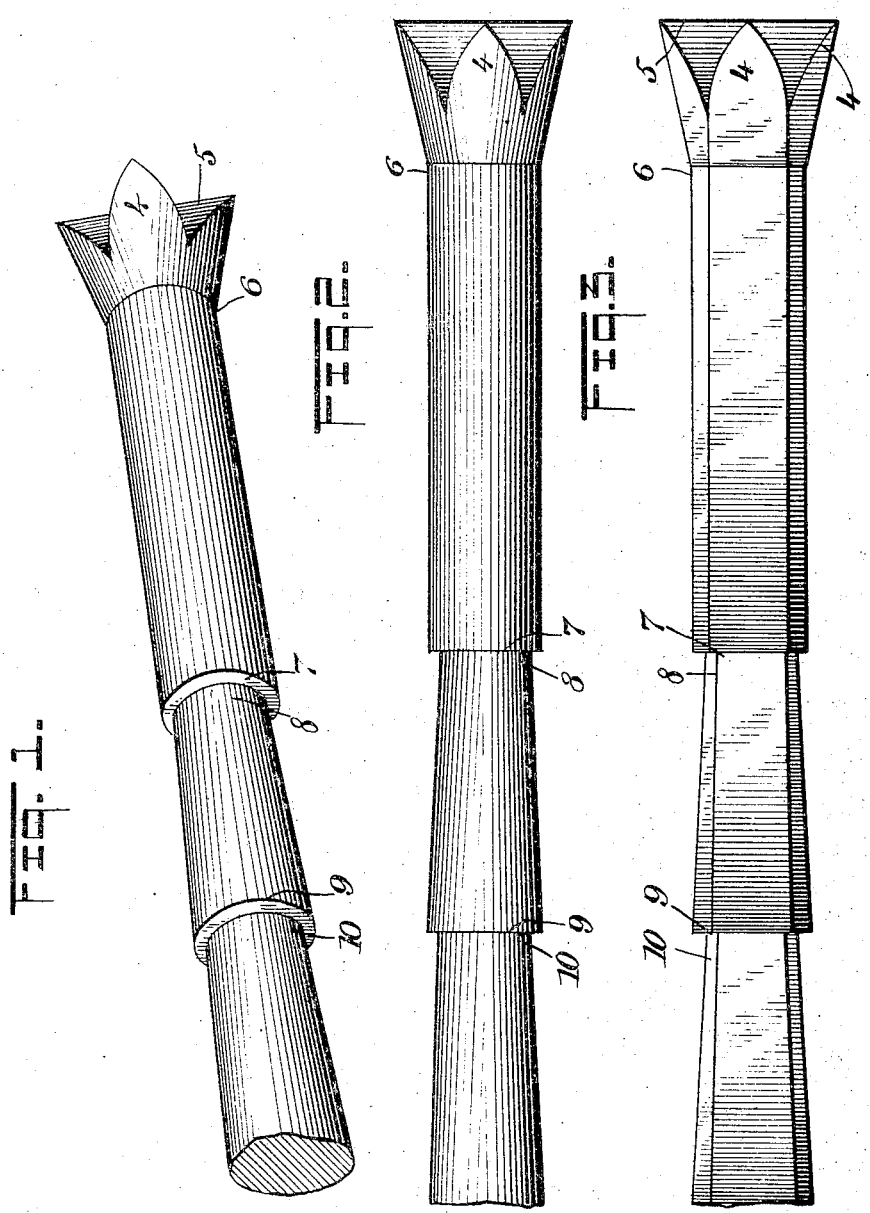
WITNESSES:
INVENTORS
Fred Russell.
Roswell P. Russell.
BY
ATTORNEYS No. 767,249. Patented August 9, 1904.

UNITED STATES PATENT OFFICE.

FRED RUSSELL AND ROSWELL P. RUSSELL, OF CRIPPLECREEK, COLORADO.

DRILL.

SPECIFICATION forming part of Letters Patent No. 767,249, dated August 9, 1904.

Application filed March 19, 1904. Serial No. 198,997. (No model.)

*To all whom it may concern:*

Be it known that we, FRED RUSSELL and ROSWELL P. RUSSELL, citizens of the United States, and residents of Cripplecreek, in the county of Teller and State of Colorado, have invented a new and Improved Drill, of which the following is a full, clear, and exact description.

Our invention relates to drills, and is applicable to all ordinary types thereof.

The objects of our invention are to provide for the carrying of the cuttings out of the hole and to prevent crookedness in the holes drilled.

Reference is to be had to the accompanying drawings, forming a part of this specification, in which similar characters of reference indicate corresponding parts in all the figures.

Figure 1 is a perspective view of a preferred form of our invention. Fig. 2 is a side view thereof, and Fig. 3 is a side view of a slightly-modified form.

In the drawings, 4 represents the external points, formed by the cutting-surfaces 5 of the drill, and 6 is the shank of the drill. This shank is preferably made of the same size for some distance back, as shown in the drawings, and then is cut away, forming a shoulder 7 and a contracted neck 8, as shown. The surface of the shank slopes back from the neck 8 to another shoulder 9, formed in the same way by cutting down to the neck 10. This portion of the shank also slopes back in the same manner to the full size of the shank. The shoulders 7 and 9 are also of the full size of the drill-shank.

The form shown in Fig. 3 is the same as the one shown in Figs. 1 and 2 in all essential particulars except that it is made of octagon steel instead of round steel. It will be obvious that our invention is not limited in this particular and that the shape of the cross-section of the shank is immaterial.

The shoulders 7 and 10 in ordinary-sized drills would preferably be about one-eighth of an inch deep and of course would entirely encircle the drill. The distance between them might conveniently be about two inches.

In operation the drill has preferably about a six-inch stroke, which throws the cuttings back to the shoulders 7 and 10, which keep passing them on out of the hole. The sharp shoulders 7 and 10 on the shanks of the drill cut out the sides of the hole if it starts to get crooked or fitchered.

It will be obvious that this improvement may be applied to various types of drills, that the dimensions mentioned are stated for convenience only, and that our invention is not in any way limited to any particular size of parts or size or kind of drills.

Having thus described our invention, we claim as new and desire to secure by Letters Patent—

A drill having a shank provided with a contracted neck, a surface sloping back therefrom to the full size of the shank, a second contracted neck at the end of said surface and a second surface sloping back to the size of the shank.

In testimony whereof we have signed our names to this specification in the presence of two subscribing witnesses.

FRED RUSSELL.
ROSWELL P. RUSSELL.

Witnesses:
JAMES OWEN,
M. B. COTTLE.